(12) United States Patent
Bjøntegaard

(10) Patent No.: US 7,660,471 B2
(45) Date of Patent: Feb. 9, 2010

(54) METHOD FOR CORRECTING INTERPOLATED PIXEL VALUES

(75) Inventor: Gisle Bjøntegaard, Oppegård (NO)

(73) Assignee: Tandberg Telecom AS, Lysaker (NO)

( * ) Notice: Subject to any disclaimer, the term of this patent is extended or adjusted under 35 U.S.C. 154(b) by 486 days.

(21) Appl. No.: 10/997,925

(22) Filed: Nov. 29, 2004

(65) Prior Publication Data
US 2005/0117810 A1 Jun. 2, 2005

(30) Foreign Application Priority Data
Nov. 28, 2003 (NO) ................................ 20035322

(51) Int. Cl.
G06K 9/36 (2006.01)
G06K 9/00 (2006.01)
(52) U.S. Cl. ............... 382/232; 382/252; 382/300; 375/240.15; 375/240.16; 375/240.17
(58) Field of Classification Search ............ 375/240.17, 375/240.13, 240.16
See application file for complete search history.

(56) References Cited

U.S. PATENT DOCUMENTS

| | | | | | |
|---|---|---|---|---|---|
| 5,659,365 | A | * | 8/1997 | Wilkinson | 375/240.15 |
| 5,805,227 | A | * | 9/1998 | Gi-Hwan | 375/240.17 |
| 6,178,202 | B1 | * | 1/2001 | Nakaya | 375/240.16 |
| 6,259,734 | B1 | | 7/2001 | Boon | |
| 6,295,376 | B1 | * | 9/2001 | Nakaya | 382/236 |
| 6,639,944 | B1 | | 10/2003 | De Haan | |
| 6,950,469 | B2 | * | 9/2005 | Karczewicz et al. | 375/240.17 |
| 7,170,529 | B2 | * | 1/2007 | Chang | 345/604 |
| 2003/0058949 | A1 | * | 3/2003 | MacInnis et al. | 375/240.29 |
| 2003/0059089 | A1 | | 3/2003 | Quinlan | |
| 2003/0156646 | A1 | * | 8/2003 | Hsu et al. | 375/240.16 |
| 2003/0194010 | A1 | * | 10/2003 | Mukerjee et al. | 375/240.16 |
| 2004/0062307 | A1 | * | 4/2004 | Hallapuro et al. | 375/240.13 |
| 2004/0076333 | A1 | * | 4/2004 | Zhang et al. | 382/238 |
| 2004/0120401 | A1 | * | 6/2004 | Linzer et al. | 375/240.16 |
| 2004/0213470 | A1 | * | 10/2004 | Sato et al. | 382/239 |
| 2005/0105611 | A1 | * | 5/2005 | Bjontegaard | 375/240.01 |
| 2006/0291563 | A1 | * | 12/2006 | Park et al. | 375/240.17 |

FOREIGN PATENT DOCUMENTS

| | | |
|---|---|---|
| EP | 1 353 513 A2 | 10/2003 |
| JP | 2003-339050 | 11/2003 |
| WO | WO 02/071741 | 9/2002 |

OTHER PUBLICATIONS

Fast Quarter Pixel motion search, Yung et al. IEICE Fundamentals, 0008022380-vol. E87-A No. 3, Mar. 2004, pp. 692-694 (Abstract only).*

"Efficient method for Half-Pixel Block Motion Estimation Using Block Differentials", Toivonen and Heikkia, International Workshop VLBV, 2003.

U.S. Appl. No. 12/268,842, filed Nov. 11, 2008, Bjontegaard, et al.

* cited by examiner

*Primary Examiner*—Brian P Werner
*Assistant Examiner*—Jayesh Patel
(74) *Attorney, Agent, or Firm*—Oblon, Spivak, McClelland, Maier & Neustadt, L.L.P.

(57) ABSTRACT

The invention is related to video compression systems, and in particular to compression/decompression in digital video systems. The present invention discloses a method for compensating the rounding and truncation error when calculating ½ and ¼ position pixels for motion vector prediction. According to the invention, the rounding/truncation offset is attenuated by properly shifting up or down the result of the calculation of the ½ position pixel values. A method alternating occurrences of converting up and converting down interpolated pixel values to nearest integers in the cases where the pixel values are decimals with fractions of 0.5. In a preferred embodiment, each motion vector is assigned either a first or a second notation, so that converting up or down in a predicted block depends on the assignment of the motion vector corresponding to the prediction block. The present invention is particularly useful in the coding standard H.264/AVC.

4 Claims, No Drawings

METHOD FOR CORRECTING INTERPOLATED PIXEL VALUES

FIELD OF THE INVENTION

The invention is related to video compression systems, and in particular to a method for calculating interpolation pixel values when determining predictions of pixel blocks in a video picture.

BACKGROUND OF THE INVENTION

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and can not be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards, all of which using block based prediction from previously encoded and decoded pictures.

The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors.

In a typical video sequence, the content of a present block M would be similar to a corresponding block in a previously decoded picture. If no changes have occurred since the previously decoded picture, the content of M would be equal to a block of the same location in the previously decoded picture. In other cases, an object in the picture may have been moved so that the content of M is more equal to a block of a different location in the previously decoded picture. Such movements are represented by motion vectors (V). As an example, a motion vector of (3; 4) means that the content of M has moved 3 pixels to the left and 4 pixels upwards since the previously decoded picture.

A motion vector associated with a block is determined by executing a motion search. The search is carried out by consecutively comparing the content of the block with blocks in previous pictures of different spatial offsets. The offset relative to the present block associated with the comparison block having the best match compared with the present block, is determined to be the associated motion vector.

In H.262, H.263, MPEG1, MPEG2 the same concept is extended so that motion vectors also can take ½ pixel values. A vector component of 5.5 then imply that the motion is midway between 5 and 6 pixels. More specifically the prediction is obtained by taking the average between the pixel representing a motion of 5 and the pixel representing a motion of 6. This is called a 2-tap filter due to the operation on 2 pixels to obtain prediction of a pixel in between. Motion vectors of this kind are often referred to as having fractional pixel resolution or fractional motion vectors. All filter operations can be defined by an impulse response. The operation of averaging 2 pixels can be expressed with an impulse response of (½, ½). Similarly, averaging over 4 pixels implies an impulse response of (¼, ¼, ¼, ¼).

SUMMARY OF THE INVENTION

In particular, in accordance with a first aspect of the invention, the present invention discloses a method in video coding or decoding for calculating interpolation ½ position pixel values and ¼ position pixel values located between integer pixel positions when determining a prediction of a first pixel block in a video picture from a second pixel block in a previous decoded video picture with a spatial offset relative to the first pixel block according to a motion vector in a set of motion vectors, carried out by calculating the ½ position pixel values by an n-tap filter on neighboring integer pixel position values including a rounding addition value, calculating the ¼ position pixel values by averaging two neighboring ½ position pixel values or one neighboring ½ position pixel value and one integer position pixel value followed by rounding or truncation, and sufficiently adjusting the rounding addition value for introducing a corrective shift in the ½ position pixel and ¼ position pixel values to compensate for an erroneous shift in the pixel values introduced by the rounding or truncation of the ¼ position pixel values.

Advantageously, the n-tap filter is a 6-tap filter.

Advantageously, the 6-tap filter has an impulse response of (1/32, -5/32, 20/32, 20/32, -5/32, 1/32) and the rounding addition value is reduced from 16/32 to 6/32.

Advantageously, the n-tap filter is a 4-tap filter.

Advantageously, the 4-tap filter has an impulse response of (-⅛, ⅝, ⅝, -⅛) and the rounding addition value is reduced from 4/8 to ⅛.

Advantageously, the video pictures in the method are encoded according to the coding standard H.264/AVC.

Further, in accordance with a second aspect of the present invention, the invention relates to a method in video coding or decoding for calculating interpolation ½ position pixel values and ¼ position pixel values located between integer pixel positions when determining a prediction of a first pixel block in a video picture from a second pixel block in a previous decoded video picture with a spatial offset relative to the first pixel block according to a motion vector in a set of motion vectors. The method comprises the steps of calculating the ½ position pixel values by an n-tap filter on neighboring integer pixel position values including a rounding addition value, calculating the ¼ position pixel values by averaging two neighboring ½ position pixel values followed by rounding, assigning a first or a second notation to respective motion vectors in the set of motion vectors, converting decimal interpolation values, which respectively have a fractional part of 0.5, to corresponding nearest lower integer values when calculating interpolation values in the second pixel block if the motion vector is assigned said first notation, and converting decimal interpolation values, which respectively have a fractional part of 0.5, to corresponding nearest upper integer values when calculating interpolation values in the second pixel block if the motion vector is assigned said second notation.

Advantageously, the step of assigning further includes assigning either said first or second notation to respective motion vectors in the set of motion vectors in a predefined alternating pattern.

Advantageously, the step of assigning further includes assigning either said first or second notation to respective motion vectors in the set of motion vectors in an alternating pattern determined by a random or pseudo random procedure having pixel data as input.

Advantageously, the step of assigning further includes assigning either said first or second notation to respective motion vectors in the set of motion vectors in an alternating pattern that is being communicating between an encoder and a decoder involved at the time of communication.

Advantageously, the interpolation values are ½ pixel position values calculated by means of a 2-tap filter.

Advantageously, the interpolation values are ¼ pixel position values calculated by means of a 2-tap filter.

Advantageously, the video pictures in the method are encoded according to the coding standard H.264/AVC.

DETAILED DESCRIPTION OF THE PRESENT INVENTION

In the following, the present invention will be discussed by describing a preferred embodiment. However, a person skilled in the art will realize other applications and modifications within the scope of the invention as defined in the enclosed independent claims.

A new video compression standard has recently been developed as a joint effort between ITU and ISO/IEC. The formal titles of the common standard in the two standardization bodies are: "ITU-T Recommendation H.264" and "ISO/IEC MPEG-4(Part 10) Advanced Video Coding". In the following this common standard will be referred to as H.264/AVC.

In H.264/AVC coding methods have improved both in terms of motion resolution and number of pixels for each interpolation. The methods use motion compensated prediction with up to ¼ pixel accuracy. Even ⅛ pixel accuracy is defined, but not included in any profile. The integer- and fractional pixel positions are indicated below (for simplicity, interpolations are only shown between A, E, U and Y):

| A" | E' | A | b | c | d | E | A' | E" |
|---|---|---|---|---|---|---|---|---|
|    |    | f | g | h | i | j |    |    |
|    |    | k | l | m | n | o |    |    |
|    |    | p | q | r | s | t |    |    |
|    |    | U | v | w | x | Y |    |    |

The positions A E U Y indicate integer pixel positions, and A", E', A' and E" indicates additional integer positions on the A-E line. c k m o w indicate half pixel positions. The interpolated values in these positions are obtained by using a 6-tap filter with impulse response (1/32, −5/32, 20/32, 20/32, −5/32, 1/32) operating on integer pixel values. As an example, c is then calculated by the following expression:

$$c = 1/32 \cdot A'' - 5/32 \cdot E' + 20/32 \cdot A + 20/32 \cdot E - 5/32 \cdot A' + 1/32 \cdot E''$$

Note that the dividend is chosen to be 32 to make the average operation adapted for data processing, as dividing with 32 can easily be implemented by a simple shift operation. The right shift operation leaves a truncated value in the data shift register, as the least significant bits fall out from the register. To provide rounding rather than truncation in digital data processing, a rounding addition value of 0.5 is conventionally included in the operation, which implies to add 16 before the right shift operation.

Alternatively, a 4-tap filter could also calculate the interpolated values using the following expression:

$$c = -1/8 \cdot E' + 5/8 \cdot A + 5/8 \cdot E - 1/8 \cdot A'$$

The filter is operated horizontally or vertically as appropriate. Further, to obtain the value for m, the filter is not operated on integer values, but on already interpolated values in the other direction. The remaining positions in the square depicted above are obtained by averaging respective integer—and half neighbor pixel positions (2 tap filter):

$$b=(A+c)/2, d=(c+E)/2, f=(A+k)/2, g=(c+k)/2, h=(c+m)/2, i=(c+o)/2, j=(E+o)/2$$

$$l=(k+m)/2, n=(m+o)/2, p=(U+k)/2, q=(k+w)/2, r=(m+w)/2, s=(w+o)/2, t=(Y+o)/2$$

$$v=(U+w)/2, x=(w+Y)/2$$

All calculations of interpolations may result in decimal values, i.e. values with fractional parts. Normally, if the fractional parts were evenly distributed, conversion to the nearest integer would not introduce overall offset errors.

However, in many cases, as when applying a 2 tap filter for calculating the ¼ pixel positions, all the decimal values would include a fractional part of 0.5. When applying a normal rounding procedure on these decimal values, all would be rounded up. Referring to the pixel denotations defined above, if A=100 and c=101, then b=101.

As already indicated, in H.264/AVC, the ¼ position pixels are obtained as the average of two positions, which may be integer position pixel or ½ position pixel. As the values of these pixels are integers, the exact calculated values are either integer or having a decimal contribution of 0.5 The 0.5 value will then be rounded up or truncated resulting in a positive or negative rounding offset of calculated prediction. The rounding offset introduces a prediction error, which represents an expected add-on to the difference between a real picture and the associated prediction. This expected add-on results in a noticeable loss of coding gain as larger differences require transmission of larger bit amounts. Similarly, consequent truncation would lead to a similar negative offset.

According to the present invention, the rounding offset described above is attenuated by properly shifting up or down (dependent on whether the ¼ position pixels were rounded up or truncated) the result of the calculation of the ½ position pixel values.

In one embodiment of the present invention, this is accomplished by introducing a slight negative or positive shift in the calculation of ½ position pixels to compensate for the above-discussed positive or negative rounding offset introduced when rounding or truncating the average of two ½ position pixel values (or one integer position pixel and one ½ position pixel value). Consequently, the equation for ½ position pixel value calculation must be modified.

According to prior art, the ¼ position pixel values are usually rounded up. This implies a positive rounding offset, which is assumed to be the case in the following example The modification of the equation for ½ pixel value calculation may be implemented in various ways, but experience has shown that this compensation could be introduced by reducing the rounding addition value added to the equation above. This will lower the overall values of the ½ position pixels, so that a proper reduction of the rounding addition value will balance the rounding error of the ¼ pixel position values, as the ¼ position pixel values are calculate from the lowered ½ position pixel values. Experiments have shown that a proper reduction of the rounding addition value will be to lower the value from 16/32 to 6/32. In the case of a 4-tap filter, the rounding addition value is lowered from 4/8 to 1/8.

In another embodiment of the present invention the rounding offset described above is attenuated by alternately converting to the upper and lower nearest integer value for the decimal values having a fractional part of 0.5.

As an example, a result of the present invention will be that the average between 100 and 101 in some cases will be converted to 100 and in other cases to 101, depended on what is defined for the certain interpolated pixel position.

The definition of which interpolated pixel positions to be converted upwards and which to be converted downwards (from now on referred to as 0.5-conversion) can be implemented in different ways. However, it is to prefer that the same 0.5-conversion for every pixel in a block for the same motion vector is used. Experience has shown that alternating 0.5-conversion internally within a block introduces high frequency content, which typically leads to larger bit usage.

Thus, in a preferred embodiment of the present invention, one 0.5-conversion is assigned to each motion vector value, but the 0.5-conversion may vary between adjacent motion vectors. In this way, biased rounding causing an offset in the pixel values is avoided.

To further illustrate the preferred embodiment, consider that a motion search is carried out for a certain block of pixels. In a motion search, the block is consecutively compared with the content of blocks in the previous picture of different spatial offsets relative to the present block. These offsets are associated with respective motion vectors. E.g. a motion vector of (0, ¼) corresponds to comparing the present block with the block in the previous picture shifted ¼ position in the vertical direction. All mean values with a fractional of 0.5 in the shifted block will then either be converted upwards or downwards depended on what kind of 0.5-conversion the motion vector in question is assigned. Thus, the type of 0.5-conversion of the prediction of a block is in the preferred embodiment depended on the position relative to the block of a previous picture, from which the prediction is taken, and the 0.5-conversion assignment of the corresponding motion vector.

Moreover, it is considered to be preferable that there is a high degree of shifting in the 0.5-conversion between nearby motion vectors. One reason for this is that a typical encoder would do final vector search in a small local area of vector positions. During this final search it is preferable that the tested vector positions represent a reasonable mixture of converting 0.5 fractional values upwards and downwards.

The rules for assigning 0.5-conversions may vary. The simplest way is to have a fixed pattern of the distribution of 0.5-conversion types in the motion vector plane. This is illustrated below. Here, each ¼ pixel vector position is assigned one of the notations "up" and "down", which defines whether decimal values with a fraction of 0.5 is to be converted upward or downward to the nearest integer. Capital letters indicate integer positions, while small letters indicate ½ pixel positions. In this case, ½ pixel positions do not have any notation since the effect is considered to be insignificant.

| A    | down | c    | down | E    |
|------|------|------|------|------|
| down | up   | down | up   | down |
| k    | down | m    | down | o    |
| down | up   | down | up   | down |
| U    | down | w    | down | Y    |

Note that the illustrated pattern is only an example, other pattern may be useful as well.

An alternative to a fixed pattern of 0.5-conversions is to have a random or pseudo random definition of the assignment of 0.5-conversions to the different motion vectors. This can be a process that is defined in a way so that both encoder and decoder is able to deduce which ¼ pixel position to be converted up and which to be converted down. This process may depend on picture data, which is known to both encoder and decoder. Such data can be (but are not limited to) block numbering, motion vector values, and coding mode. The data may be input to a procedure determining a pseudo random pattern of alternating 0.5-conversion assignments over the motion vector plane.

Still another alternative to fixed pattern is a none-predefined pattern, which is communicated from the encoder to the decoder at the time of transmission. In this case, it is preferable that the amount of data dedicated for this purpose is limited so that it doesn't compromise with coding efficiency.

Note that there are many possible values of the fractional part of the interpolation values, as for instance when using the 6-tap filter described above for the ½ pixel positions, the fractional part of 0.5 occurs seldom and it normally does not make much difference which 0.5-conversion is applied. On the other hand, when averaging between 2 pixels, which is the case for ¼ pixel positions, the fractional part of 0.5 could typically occur in about half of the events. The difference between doing a consequent 0.5-conversion is therefore much larger, and present invention is therefore most useful when calculating ¼ pixel positions.

The main advantage of the invention is that it removes the offset introduced by biased rounding, and thereby increase the coding efficiency.

The invention claimed is:

1. A method in video coding or decoding executed at a video compression apparatus for calculating interpolation ½ position pixel values and ¼ position pixel values located between integer pixel positions when determining a prediction of a first pixel block in a video picture from a second pixel block in a previous decoded video picture with a spatial offset relative to the first pixel block according to a motion vector in a set of motion vectors, said method comprising:

calculating, at the video compressing apparatus, the ½ position pixel values by a six-tap filter on neighboring integer pixel position values including a rounding addition value of 16/32 or calculating the ½ position pixel values by a four-tap filter on neighboring integer pixel position values including a rounding addition value 4/8, calculating, at the video compressing apparatus, the ¼ position pixel values by averaging two neighboring ½ position pixel values or one neighboring ½ position pixel value and one integer position pixel value followed by rounding or truncation, and adjusting, at the video compressing apparatus, previously calculated ½ position pixel values by a negative or positive shift to compensate for an error introduced by rounding or truncating calculated ¼ position pixel values by reducing the rounding addition value to a value less than $16/32$ if the six-tap filter is used and reducing the rounding addition value to a value less than $4/8$ if the four-tap filter is used.

2. A method in video coding or decoding executed at a video compression apparatus for calculating interpolation ½ position pixel values and ¼ position pixel values located between integer pixel positions when determining a prediction of a first pixel block in a video picture from a second pixel block in a previous decoded video picture with a spatial offset relative to the first pixel block according to a motion vector in a set of motion vectors, said method comprising the steps of:

calculating, at the video compressing apparatus, the ½ position pixel values by an 6-tap filter on neighboring integer pixel position values including a rounding addition value, wherein the 6-tap filter has an impulse response of $(1/32, -5/32, 20/32, 20/32, -5/32, 1/32)$, calculating, at the video compressing apparatus, the ¼ position pixel values by averaging two neighboring ½ position pixel values or one neighboring ½ position pixel value and one integer position pixel value followed by rounding or truncation, and adjusting, at the video compressing apparatus, previously calculated ½ position pixel values by a negative or positive shift to compensate for an error introduced by rounding or truncating calculated ¼ position pixel values by reducing the rounding addition value from $16/32$ to $6/32$.

3. A method in video coding or decoding executed at a video compressing apparatus for calculating interpolation ½ position pixel values and ¼ position pixel values located between integer pixel positions when determining a prediction of a first pixel block in a video picture from a second pixel block in a previous decoded video picture with a spatial offset relative to the first pixel block according to a motion vector in a set of motion vectors, said method comprising the steps of:

calculating, at the video compressing apparatus, the ½ position pixel values by an 4-tap filter on neighboring integer pixel position values including a rounding addition value, wherein the 4-tap filter has an impulse response of $(-1/8, 5/8, 5/8, -1/8)$, calculating, at the video compressing apparatus, the ¼ position pixel values by averaging two neighboring ½ position pixel values or one neighboring ½ position pixel value and one integer position pixel value followed by rounding or truncation, and adjusting, at the video compressing apparatus, previously calculated ½ position pixel values by a negative or positive shift to compensate for an error introduced by rounding or truncating calculated ¼ position pixel values by reducing the rounding addition value from $4/8$ to $1/8$.

4. The method according to one of the claims 1, 2, and 3, wherein the video pictures are encoded according to the coding standard H.264/AVC.

* * * * *